(12) United States Patent
Funaki et al.

(10) Patent No.: US 7,138,461 B2
(45) Date of Patent: Nov. 21, 2006

(54) FLUORINE-CONTAINING COPOLYMER MOLDING MATERIAL

(75) Inventors: Atushi Funaki, Yokohama (JP); Naoko Sumi, Yokohama (JP); Teruo Takakura, Yokohama (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 11/020,215

(22) Filed: Dec. 27, 2004

(65) Prior Publication Data

US 2005/0107535 A1    May 19, 2005

Related U.S. Application Data

(62) Division of application No. 09/719,177, filed as application No. PCT/JP99/03138 on Jun. 11, 1999, now abandoned.

(30) Foreign Application Priority Data

Jun. 15, 1998    (JP) .................................. 10-167401

(51) Int. Cl.
*C08F 8/00* (2006.01)

(52) U.S. Cl. ................... 525/326.2; 525/366; 525/367; 525/368; 528/480

(58) Field of Classification Search ............. 525/326.2, 525/366, 367, 368; 528/480
See application file for complete search history.

(56) References Cited

U.S. PATENT DOCUMENTS 5,237,049 A    8/1993    Cavanaugh et al. ........ 528/491
5,546,182 A    8/1996    Sota ........................... 356/312
5,804,744 A *  9/1998    Tan et al. ................. 73/864.34
5,856,417 A    1/1999    Takakura et al. ........... 526/247
5,861,464 A *  1/1999    Goldmann et al. ....... 525/326.4
6,277,464 B1   8/2001    Ronan et al. ................ 428/131

FOREIGN PATENT DOCUMENTS

| EP | 0 796 896 A1 |   | 9/1997 |
| EP | 796896 A1 | * | 9/1997 |
| EP | 1162212 A1 | * | 12/2001 |
| JP | 60-240713 |   | 11/1985 |
| JP | 1-197510 |   | 8/1989 |
| JP | 9-500163 |   | 1/1997 |
| JP | 9-183812 |   | 7/1997 |
| WO | WO-97/08239 | * | 3/1997 |
| WO | WO 97/08239 |   | 3/1997 |
| WO | WO 99/50139 |   | 10/1999 |
| WO | WO-99/65954 | * | 12/1999 |

OTHER PUBLICATIONS

Patent Abstracts of Japan, JP 62-054730, Mar. 10, 1987.
Patent Abstracts of Japan, JP 62-050340, Mar. 5, 1987.
U.S. Appl. No. 11/020,215, filed Dec. 27, 2004, Funaki et al.
U.S. Appl. No. 08/983,517, filed Jan. 29, 1998, Funaki et al.

* cited by examiner

*Primary Examiner*—David W. Wu
*Assistant Examiner*—Henry S. Hu
(74) *Attorney, Agent, or Firm*—Oblon, Spivak, McClelland, Maier & Neustadt, P.C.

(57) ABSTRACT

A molding material consisting of a fluorine-containing copolymer, which has a metal elution index η of at most 10 as the total amount in ng of metals of Na, Mg, Cu, Cr, Ni, K, Ca and Fe per 1 g of the molding material, as obtained by elution analysis of the molding material with nitric acid.

5 Claims, No Drawings

FLUORINE-CONTAINING COPOLYMER MOLDING MATERIAL

This is a divisional application of U.S. application Ser. No. 09/719,177, filed on Dec. 15, 2000 now abandoned.

TECHNICAL FIELD

The present invention relates to a molding material consisting of a fluorine-containing copolymer, which is excellent in heat resistance and which is less likely to be colored even when held at a high temperature for a long period of time.

BACKGROUND ART

For coating materials for heat resistant insulated wires, medical parts, parts for chemicals storage tank of a semiconductor production device, and parts for carrier and piping, fluorine-containing copolymers such as a tetrafluoroethylene (hereinafter referred to as TFE)/perfluoro(alkyl vinyl ether)copolymer (hereinafter referred to as PFA), a TFE/hexafluoropropylene (hereinafter referred to as HFP) copolymer (hereinafter referred to as FEP) and a TFE/ethylene copolymer (hereinafter referred to as ETFE), and polytetrafluoroethylene (hereinafter referred to as PTFE), are used as molding materials, in view of excellent electrical insulating properties, low-dielectric constant, heat resistance and chemical resistance. It is possible to carry out melt-molding of molding materials consisting of a fluorine-containing copolymer such as PFA, FEP or ETFE, and such molding materials can be molded by means of various molding methods such as injection molding, extrusion and rotational molding.

However, with respect to molding materials consisting of such a fluorine-containing copolymer, molded products may slightly be yellowed during melt-molding in some cases, and the colored molded products may cause decrease in yield of manufactured articles, since strict product quality is required particularly for parts for medical application and semiconductor device application.

DISCLOSURE OF THE INVENTION

The present invention provides a molding material consisting of a fluorine-containing copolymer (hereinafter sometimes referred to simply as a molding material) which provides, by melt-molding, a molded product which is less likely to be colored.

The present inventors have conducted extensive studies to overcome the above-mentioned problems and as a result, have found that a molding material having a total amount of specific metal elements, among metal elements eluted from the molding material by a method of eluting metals by heating the molding material with nitric acid, within a specific range, is less likely to be colored even after melt-molded. The present invention has been accomplished on the basis of this discovery.

The present invention provides a molding material consisting of a fluorine-containing copolymer, which has a metal elution index $\eta$ of at most 10.

The present invention further provides a process for producing the above-mentioned molding material, which comprises carrying out polymerization by using raw materials having low metal contents, and forming the fluorine-containing copolymer thus produced into a molding material so that the fluorine-containing copolymer will not contact the surface of a metal portion of a production equipment.

A molded product obtained by melt-molding the molding material of the present invention at a high temperature is less likely to be colored, and is suitable for various parts for medical application and semiconductor application.

BEST MODE FOR CARRYING OUT THE INVENTION

In the present invention, the metal elution index $\eta$ is the total amount in nanogram (hereinafter referred to as ng) of specific metal elements eluted per 1 g of the fluorine-containing copolymer, as measured by the following metal elution amount analysis method.

The specific metal elements are metal elements of Na, Mg, Cu, Cr, Ni, K, Ca and Fe. These metal elements include not only metal simple substances but also metal ions and metal compounds such as metal oxides. Here, in the case of the metal compounds, it is represented by the amount in ng as calculated as metal simple substances.

The metal elution amount analysis method is a method wherein a container made of PFA equipped with a lid is subjected to heat treatment in ultrapure nitric acid and in ultrapure water, each at 80° C. for 1 week, 5 g of a molding material is batched off to the container thus treated, 3 ml of a 6.8% ultrapure nitric acid is added thereto, the container is lidded and heated by a hot plate at 80° C. for 2 hours, and the ultrapure nitric acid containing eluted metal elements is quantitatively analyzed by an inductively coupled plasma mass spectroscope (ICP-MS).

Here, all the metal contents of Na, Mg, Cu, Cr, Ni, K, Ca and Fe in the ultrapure nitric acid and ultrapure water used are at most 0.1 ppb.

In the present invention, the metal elution index $\eta$ of the molding material is at most 10, preferably at most 7. Here, "at most 10" means at most 10 including 0, and "at most 7" means at most 7 including 0. If it exceeds 10, a molded product to be obtained by melt molding tends to be significantly colored.

As the fluorine-containing copolymer in the present invention, a copolymer of fluorine-containing monomers, or a copolymer of a fluorine-containing monomer with a comonomer other than the fluorine-containing monomer, may, for example, be mentioned. The fluorine-containing copolymer is preferably one which can be melt-molded.

The fluorine-containing monomer may, for example, be a fluoroolefin such as TFE, chlorotrifluoroethylene, HFP, vinylidene fluoride or vinyl fluoride, or a monomer such as perfluoro(alkyl vinyl ether) or (perfluoroalkyl)ethylene. The fluorine-containing monomer may be used alone or in combination as a mixture of two or more of them.

Further, as the comonomer other than the fluorine-containing monomer, an ethylene type unsaturated compound is preferably used. As the ethylene type unsaturated compound, a vinyl ether, an allyl ether, a carboxylic acid vinyl ester, a carboxylic acid allyl ester or an olefin may, for example, be mentioned.

As the vinyl ether, a cycloalkyl vinyl ether such as cyclohexyl vinyl ether, or an alkyl vinyl ether such as ethyl vinyl ether, nonyl vinyl ether, 2-ethylhexyl vinyl ether, hexyl vinyl ether, n-butyl vinyl ether or t-butyl vinyl ether, may, for example, be mentioned. As the allyl ether, an alkyl allyl ether such as ethyl allyl ether or hexyl allyl ether may, for example, be mentioned.

The carboxylic acid as the material for the carboxylic acid vinyl ester or the carboxylic acid allyl ester, may, for example, be acetic acid, propionic acid, butyric acid, pivalic acid or benzoic acid.

As the olefin, ethylene, propylene or isobutylene may, for example, be mentioned.

The comonomer copolymerizable with the above-mentioned fluorine-containing monomer may be used alone or in combination as a mixture of two or more of them, such as two vinyl ethers or a vinyl ether and an olefin As the fluorine-containing copolymer of the present invention, preferred are PFA, FEP and ETFE. PFA is a copolymer having a copolymerization molar ratio of TFE/perfluoro(alkyl vinyl ether) of 99.5/0.5 to 97/3, FEP is a copolymer having a copolymerization molar ratio of TFE/HFP of 95/5 to 85/15, and ETFE is a copolymer having a copolymerization molar ratio of TFE/ethylene of 30/70 to 70/30. Such copolymers may be copolymers of the described monomers with a small amount of another monomer.

The molding material of the present invention is a molding material which is in a form of a powder, granules or pellets or in another form, and which can be molded by injection molding, extrusion or another molding method. Said molding method includes, at least in a part thereof, a step of melting the molding material.

The molding material of the present invention may be produced by the following method. Namely, a desired molding material can be produced by carrying out a polymer production process comprising a polymerization step, a granulation step, a drying step, a pelletizing step, a washing step, etc., and a step of forming a copolymer into a molding material, so that the fluorine-containing copolymer or the molding material will not contact the surface of a metal portion of an equipment as far as possible, and in addition, raw materials for the fluorine-containing copolymer will not contact the surface of a metal portion of an equipment such as a piping for storage and transportation as far as possible, so as to prevent the above-mentioned specific metal elements from being mixed with the molding material.

Further, the molding material of the present invention may be produced by using raw materials such as a fluorine-containing monomer, a comonomer, a polymerization medium, a chain transfer agent and a medium to be used for granulation of the fluorine-containing copolymer, having low contents of the above-mentioned specific metal components, having low contents of the above-mentioned specific metal components. The total contents of the metal components of Na, Mg, Cu, Cr, Ni, K, Ca and Fe, in such raw materials, are preferably at most 10 ppb, particularly preferably at most 5 ppb, respectively. Particularly, each of the fluorine-containing monomer as the main raw material, the comonomer and the polymerization medium (such as water or solvent) which the fluorine-containing copolymer will greatly contact, etc., has a total content of the specific metal components of preferably at most 10 ppb.

Here, the raw materials to be used vary depending upon the polymerization method. For example, in a case of solution polymerization, a fluorine-containing monomer, a comonomer, a fluorine type solvent such as $F(CF_2)_6H$ or $F(CF_2)_6F$, a nonionic organic polymerization initiator, a chain transfer agent and the like may be used, and in a case of suspension polymerization, water may be used in addition to the fluorine type solvent and the like as materials for the solution polymerization.

The fluorine-containing copolymer of the present invention may be produced by various polymerization methods such as emulsion polymerization, suspension polymerization and solution polymerization. However, the emulsion polymerization, where an ionic type polymerization initiator and an ionic type emulsifier are used and metal ions due to the emulsifier remaining in the fluorine-containing copolymer produced by the polymerization have to be approximately completely removed, is unfavorable in view of production process.

It is preferred to cover the surface of a metal portion of a production equipment which the fluorine-containing copolymer will contact in the production process, with a molten fluoroplastic having good heat resistance and chemical resistance, such as PFA, FEP or ETFE. If the surface of a metal portion is not covered with a fluoroplastic, the molding material to be obtained tends to have a high metal elution index η, and the molded product to be obtained by melt-molding it tends to be colored significantly.

It is preferred to cover the metal surface of a piping or a tank for granulation of the fluorine-containing copolymer which the raw materials will contact, with a fluoroplastic, also in the production process after the polymerization. Here, in a case of producing a molding material in a form of pellets by pelletizing the fluorine-containing copolymer, it is necessary to use a metal as a material for e.g. a screw of an extruder as a pelletizing equipment. Accordingly, it is preferred to use a corrosion resistant metal material such as hastelloy C as a material for at least a part which the molten fluorine-containing copolymer will contact. However, in a case where the molding material is in a form of other than pellets, i.e. the molding material is in a form of beads or a powder, for example, the molding material tends to have lower contents of metal components, since it can be produced without pelletizing step comprising melt forming.

A molded product of the fluorine-containing copolymer obtained by using the molding material of the present invention by means of a molding method such as injection molding, extrusion or rotational molding, is less likely to be colored. Even if a small amount of metal components is mixed therewith during molding, the amount of metal components in the molded product obtained from the molding material of the present invention having lower metal component contents is smaller than the amount of metal components in a molded product obtained from a conventional molding material. The molding material of the present invention may be used alone or in combination with various additives added thereto, for molding.

Now, the present invention will be explained in further detail with reference to Examples and Comparative Examples. However, it should be understood that the present invention is by no means restricted thereto.

As the coloring degree, the YI value of a fluorine-containing copolymer subjected to pelletizing by melt-molding at a high temperature, was measured by a color difference meter (ZE-2000, manufactured by Nippon Denshoku Kogyo). The higher the YI value, the deeper in yellow.

The melt index (hereinafter referred to as MI) as an index of the molecular weight of the fluorine-containing copolymer is an exit velocity (g/10 min) of the fluorine-containing copolymer extruded at 372° C. in the case of PFA or FEP, or at 297° C. in the case of ETFE, when a load of 5 kg was applied to a die with a diameter of 2.1 mm and a length of 8 mm.

The polymer composition was obtained in such a manner that a film having a thickness of 30 μm was prepared by press molding at 340° C. in the case of PFA or FEP, and the infrared spectrum of this film was measured, as follows.

The content (wt %) of polymer units based on perfluoro(propyl vinyl ether) in PFA was obtained by dividing the absorbance at 993 cm$^{-1}$ by the absorbance at 2350 cm$^{-1}$, and multiplying the obtained value by 0.95.

The content (wt %) of polymer units based on HFP in FEP was obtained by dividing the absorbance at 980 cm$^{-1}$ by the absorbance at 2350 cm$^{-1}$, and multiplying the obtained value by 3.2.

The composition of ETFE was obtained by quantitative determination of the amount of hydrofluoric acid formed by thermal decomposition of the resin.

The metal component contents in a polymerization solvent, water as a solvent for granulation and methanol as a chain transfer agent, used in Examples and Comparative Examples, are shown below. The metal component contents in ultrapure water were Na:2 ppb, Mg:0 ppb, Cu:0 ppb, Cr:0 ppb, Ni:0 ppb, K:2 ppb, Ca:2 ppb and Fe:0 ppb. The metal component contents in distilled water of industrial water were Na:5 ppb, Mg:0 ppb, Cu:2 ppb, Cr:0 ppb, Ni:2 ppb, K:2 ppb, Ca:5 ppb and Fe:10 ppb.

The metal component contents in high purity methanol were Na:2 ppb, Mg:0 ppb, Cu:0 ppb, Cr:0 ppb, Ni:0 ppb, K:1 ppb, Ca:2 ppb and Fe:0 ppb. The metal component contents in methanol in a normal grade were Na:5 ppb, Mg:0 ppb, Cu:2 ppb, Cr:5 ppb, Ni:1 ppb, K:2 ppb, Ca:3 ppb and Fe:5 ppb. As the high purity methanol, EL grade manufactured by Kanto Chemical Co., Inc. was employed, and as the methanol in a normal grade, a guaranteed reagent manufactured by Kanto Chemical Co., Inc. was employed.

EXAMPLE 1

Equipments in a polymerization step, a granulation step and a drying step and piping portions, which raw materials and a fluorine-containing copolymer would contact, were lined and covered with PFA having a melt elution index η of 25. To a polymerization tank of 400 l, 188 l of ultrapure water, 78 l of perfluorohexane as a polymerization solvent, 9.5 l of high purity methanol and 14.0 kg of perfluoro(propyl vinyl ether) were introduced, the temperature in the tank was brought to be 50° C., then TFE was introduced, and the pressure in the polymerization tank was brought to be 1.3 MPa.

The metal component contents in TFE were Na:0 ppb, Mg:0 ppb, Cu:0 ppb, Cr:0 ppb, Ni:1 ppb, K:1 ppb, Ca:0 ppb and Fe:2 ppb.

The metal component contents in perfluorohexane were Na:1 ppb, Mg:0 ppb, Cu:0 ppb, Cr:0 ppb, Ni:0 ppb, K:1 ppb, Ca:2 ppb and Fe:1 ppb.

The metal component contents in perfluoro(propyl vinyl ether) were Na:1 ppb, Mg:0 ppb, Cu:0 ppb, Cr:0 ppb, Ni:0 ppb, K:1 ppb, Ca:1 ppb and Fe:1 ppb.

As a polymerization initiator, a 0.05% perfluorohexane solution of bis(perfluorobutyryl)peroxide was added to initiate the polymerization. TFE was charged so that the pressure would be constant. The solution of the polymerization initiator was continuously introduced so that the polymerization rate would be approximately constant during polymerization, and a total of 5.1 l was introduced.

Here, the metal component contents in the 0.05% perfluorohexane solution of bis(perfluorobutyryl)peroxide were Na:1 ppb, Mg:0 ppb, Cu:0 ppb, Cr:0 ppb, Ni:0 ppb, K:1 ppb, Ca:2 ppb and Fe:1 ppb.

When eight hours passed after the initiation of the polymerization and the total amount of after-introduced TFE reached 40 kg, the polymerization tank was cooled to room temperature, and an unreacted gas was purged, to obtain a slurry containing a polymer formed. The slurry was transferred from the bottom of the polymerization tank to a granulation tank through a piping, while applying a pressure to the polymerization tank with nitrogen. Here, the contents in the granulation tank of 1000 l having 500 l of ultrapure water preliminarily introduced thereto were heated to 90° C. with stirring, and the perfluorohexane was evaporated and distilled off to granulate the polymer. The obtained granules were transferred to a drying oven through a piping, and dried at 150° C. for 8 hours. The amounts of eluted metal components of the granules after drying were Na:1.0 ng, Mg:0 ng, Cu:0 ng, Cr:0 ng, Ni:0.1 ng, K:1.0 ng, Ca:2.0 ng and Fe:0.1 ng, per 1 g of the granules.

The granules after drying was transferred to an extruder in a clean room through a piping, to carry out palletizing. The extruder had an aperture of 65 mm and L/D=25, and was made of a corrosion resistant material of hastelloy C. Extrusion conditions were $C_1$=340° C., $C_2$=360° C., $C_3$=380° C., $C_4$=380° C., $C_5$=380° C., die temperature: 380° C. and number of revolution of screw: 40 rpm.

The pelletized polymer had a MI of 12.1, a content of polymer units based on perfluoro(propyl vinyl ether) in the polymer of 1.3 mol %, and a YI value of −7.8. Further, the amounts of eluted metal components in the polymer were Na:1.0 ng, Mg:0 ng, Cu:0 ng, Cr:0.1 ng, Ni:0.1 ng, K:1.2 ng, Ca:2.5 ng and Fe:0.5 ng, and the metal elution index η was 5.4.

EXAMPLE 2

FEP was produced by using the same equipments etc. as in Example 1. Pellets were obtained by carrying out polymerization, granulation and drying in the same manner as in Example 1 except that 160 kg of HFP was introduced instead of perfluoro(propyl vinyl ether) of Example 1, 53 l of perfluorohexane and 1.25 l of high purity methanol were used, and the total amount of the solution of the polymerization initiator was 20.3 l. Extrusion conditions were $C_1$=320° C., $C_2$=320° C., $C_3$=330° C., $C_4$=340° C., $C_5$=340° C., die temperature: 350° C., number of revolution of screw: 45 rpm.

The pelletized polymer had a MI of 12.1, a content of polymer units based on HFP in the polymer of 7.9 mol %, and a YI value of −5.1. Further, the amounts of eluted metal components in the polymer were Na:1.5 ng, Mg:0.1 ng, Cu:0.1 ng, Cr:0.1 ng, Ni:0.1 ng, K:1.2 ng, Ca:2.2 ng and Fe:1.2 ng, and the metal elution index η was 6.5.

EXAMPLE 3

ETFE was produced by using the same equipments etc. as in Example 1. Pellets were obtained by carrying out polymerization, granulation and drying in the same manner as in Example 1 except that 3.9 kg of ethylene was introduced instead of perfluoro(propyl vinyl ether) of Example 1, 3.0 l of high purity methanol was used, the total amount of the solution of the polymerization initiator was 7.3 l, and a mixture of TFE and ethylene was introduced instead of TFE so that the pressure would be constant. Extrusion conditions were $C_1$=260° C., $C_2$=280° C., $C_3$=300° C., $C_4$=310° C., $C_5$=310° C., die temperature: 310° C., and number of revolution of screw: 50 rpm.

The pelletized polymer had a MI of 7.6, a molar ratio of (polymer units based on TFE)/(polymer units based on ethylene) of 53/47, and a YI value of −6.8. Further, the amounts of eluted metal components in the polymer were Na:1.5 ng, Mg:0.1 ng, Cu:0.1 ng, Cr:0.1 ng, Ni:0.1 ng, K:1.2 ng, Ca:2.2 ng and Fe:1.2 ng, and the metal elution index η was 6.5.

EXAMPLE 4 (COMPARATIVE EXAMPLE)

Pellets were produced in the same method under the same conditions as in Example 1 except that equipments having a piping and a polymerization tank made of stainless steel (SUS317) were used, and distilled water of industrial water and methanol in a normal grade were used for the polymerization. The pelletized polymer had a MI of 12.7, a content of polymer units based on perfluoro(propyl vinyl ether) in the polymer of 1.3 mol %, and a YI value of −2.1. Further, the amounts of eluted metal components in the polymer were Na:3.5 ng, Mg:0.6 ng, Cu:0.1 ng, Cr:0.8 ng, Ni:1.5 ng, K:2.2 ng, Ca:11.5 ng and Fe:36.5 ng, and the metal elution index η was 56.7.

EXAMPLE 5 (COMPARATIVE EXAMPLE)

Pellets were produced in the same method under the same conditions as in Example 2 except that the same equipments etc. as in Example 4 were used, and the same distilled water and methanol as in Example 4 were used. The pelletized polymer had a MI of 8.0, a content of polymer units based on perfluoro(propyl vinyl ether) in the polymer of 0.7 mol %, and a YI value of +1.3. Further, the amounts of eluted metal components in the polymer were Na:7.6 ng, Mg:0.2 ng, Cu:0.1 ng, Cr:1.2 ng, Ni:2.5 ng, K:8.2 ng, Ca:11.5 ng and Fe:18.5 ng, and the metal elution index η was 39.8.

EXAMPLE 6 (COMPARATIVE EXAMPLE)

Pellets were produced in the same method under the same conditions as in Example 3 except that the same equipments etc. as in Example 4 were used, and the same distilled water and methanol as in Example 4 were used. The pelletized polymer had a MI of 7.9, a molar ratio of (polymer units based on TFE)/(polymer units based on ethylene) of 53/47, and a YI value of −1.1. Further, the amounts of eluted metal components in the polymer were Na:3.7 ng, Mg:0.3 ng, Cu:0.3 ng, Cr:1.5 ng, Ni:3.5 ng, K:3.1 ng, Ca:14.6 ng and Fe:23.4 ng, and the metal elution index η was 40.4.

The invention claimed is:

1. A process for producing a molding material comprising a fluorine-containing copolymer, which has a metal elution index η of at most 10 (where the metal elution index η is the total amount in nanogram (hereinafter referred to as ng) of specific metal components eluted per 1 g of the fluorine-containing copolymer, as defined in the description), which process comprises carrying out polymerization by using raw materials having low contents of the specific metal components, and forming the fluorine-containing copolymer thus produced into a molding material so that the fluorine-containing copolymer will not significantly contact the surface of a metal portion of production equipment used in producing the molding material, wherein the specific metal components are at least one of Na, Mg, Cu, Cr, Ni, K, Ca and Fe.

2. The process for producing the molding material according to claim 1, wherein the total contents of the specific metal components in the raw materials, are at most 10 ppb.

3. The process for producing the molding material according to claim 2, wherein the total contents are at most 5 ppb.

4. The process for producing the molding material according to claim 1, wherein the surface of a metal portion of said production equipment is covered with a molten fluoroplastic.

5. The process for producing the molding material according to claim 1, wherein the fluorine-containing copolymer is a tetrafluoroethylene/perfluoro (alkyl vinyl ether) copolymer, a tetrafluoroethylene/hexafluoropropylene copolymer, or a tetrafluoroethylene/ethylene copolymer.

* * * * *